United States Patent
McCann et al.

(10) Patent No.: US 8,113,563 B1
(45) Date of Patent: Feb. 14, 2012

(54) SWING AWAY TRUCK BED CARGO RACK

(75) Inventors: Robert F. McCann, Newport Coast, CA (US); Alessandro Zezza, Los Angeles, CA (US); Bob Thomas, Thousand Oaks, CA (US); Julius Q. Bernardo, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/118,641

(22) Filed: May 31, 2011

(51) Int. Cl.
*B60P 3/00* (2006.01)
(52) U.S. Cl. .......................................... 296/3; 224/405
(58) Field of Classification Search ....... 296/3; 224/405
See application file for complete search history.

(56) References Cited

U.S. PATENT DOCUMENTS

| | | | | | |
|---|---|---|---|---|---|
| 5,316,190 | A | * | 5/1994 | Bullock | 224/405 |
| 5,743,583 | A | * | 4/1998 | Lowe | 296/3 |
| 6,655,722 | B2 | * | 12/2003 | Bareket | 296/3 |
| 7,641,251 | B1 | * | 1/2010 | Stepanians | 296/3 |
| 7,665,799 | B1 | * | 2/2010 | Winter, IV | 296/183.1 |

* cited by examiner

*Primary Examiner* — Joseph Pape
(74) *Attorney, Agent, or Firm* — Quinn Law Group, PLLC

(57) ABSTRACT

A vehicle includes a body that defines an exposed cargo area, and a cargo rack pivotably attached to the body for rotational movement between a deployed position and a stowed position. When in the deployed position, a crossbar portion of the cargo rack is disposed above the cargo area to support cargo. When in the stowed position, the crossbar portion is concealed to provide uninterrupted access to the cargo area from above.

14 Claims, 5 Drawing Sheets

SWING AWAY TRUCK BED CARGO RACK

TECHNICAL FIELD

The invention generally relates to a cargo rack for an exposed cargo area of a vehicle.

BACKGROUND

Exposed cargo areas of vehicles, such as but not limited to a bed of a pick-up truck, are used for hauling cargo of all different shapes and/or sizes. If the cargo to be hauled is longer than the exposed cargo area, then the cargo may be positioned above the cargo area and extend forward over a passenger compartment roof surface of the vehicle. If positioned in such a manner, the cargo must be supported rearward of the roof surface, vertically above the exposed cargo area.

SUMMARY

A vehicle is provided. The vehicle includes a body having a first side wall and a second side wall. The first side wall and the second side wall extend along a longitudinal axis, and are spaced opposite each other to define a cargo area therebetween. The first side wall and the second side wall each define an upper edge. A cargo rack is attached to and extends between the first side wall and the second side wall. The cargo rack is pivotably moveable between a stowed position and a deployed position. The cargo rack includes a crossbar portion that is vertically spaced above the upper edges of the first side wall and the second side wall when in the deployed position. The cargo rack is concealed to provide uninterrupted access to the cargo area when in the stowed position.

A vehicle is also provided that includes a body having a first side wall, a second side wall, a front wall and a rear wall. The first side wall and the second side wall extend along a longitudinal axis, and are spaced opposite each other. The front wall and the rear wall are disposed perpendicularly relative to the longitudinal axis, and are spaced opposite each other along the longitudinal axis. The first side wall, the second side wall, the front wall and the rear wall cooperate to define a cargo area therebetween. The first side wall and the second side wall each define an upper edge. A cargo rack includes a crossbar portion, a first extension and a second extension. The crossbar portion extends between the first side wall and the second side wall. A first extension is attached to the crossbar portion, and extends from the crossbar portion a length to a mounting end. The second extension is attached to the crossbar portion, and extends from the crossbar portion a length to a mounting end. The mounting end of the first extension is pivotably mounted to the first side wall at a first connection point, and the mounting end of the second extension is pivotably mounted to the second side wall at a second connection point. The cargo rack is pivotably moveable about a rotation axis, which extends between the first connection point and the second connection point, between a stowed position and a deployed position. The crossbar portion is vertically spaced above the upper edges of the first side wall and the second side wall when in the deployed position, and is concealed to provide uninterrupted access to the cargo area from above when in the stowed position. A latching mechanism is configured for releasably securing the cargo rack in an intermediate position disposed between the stowed position and the deployed position. The first connection point and the second connection point are spaced from the front wall of the cargo area along the longitudinal axis a distance equal to or greater than the length of the first extension and the second extension. The first connection point and the second connection point are also disposed adjacent the upper edges of the first side wall and the second side wall respectively.

Accordingly, when needed to support cargo, the moveable cargo rack may be positioned in the deployed position, or in an intermediate position between the deployed position and the stowed position, to support cargo thereon. For example, the cargo rack may be positioned in the deployed position such that cargo may be supported across the cargo rack and a roof surface of a passenger compartment of the vehicle. When not needed for supporting cargo, the cargo rack may be positioned in the stowed position, out of the way so as to not interfere with the cargo area and to provide a more aesthetically pleasing profile. Furthermore, as the cargo rack may increase wind resistance of the vehicle when in the deployed position, thereby decreasing fuel efficiency of the vehicle, positioning the cargo rack in the stowed position when not needed for transporting cargo may increase the fuel efficiency of the vehicle.

The above features and advantages and other features and advantages of the present invention are readily apparent from the following detailed description of the best modes for carrying out the invention when taken in connection with the accompanying drawings.

DETAILED DESCRIPTION

Figure 1:
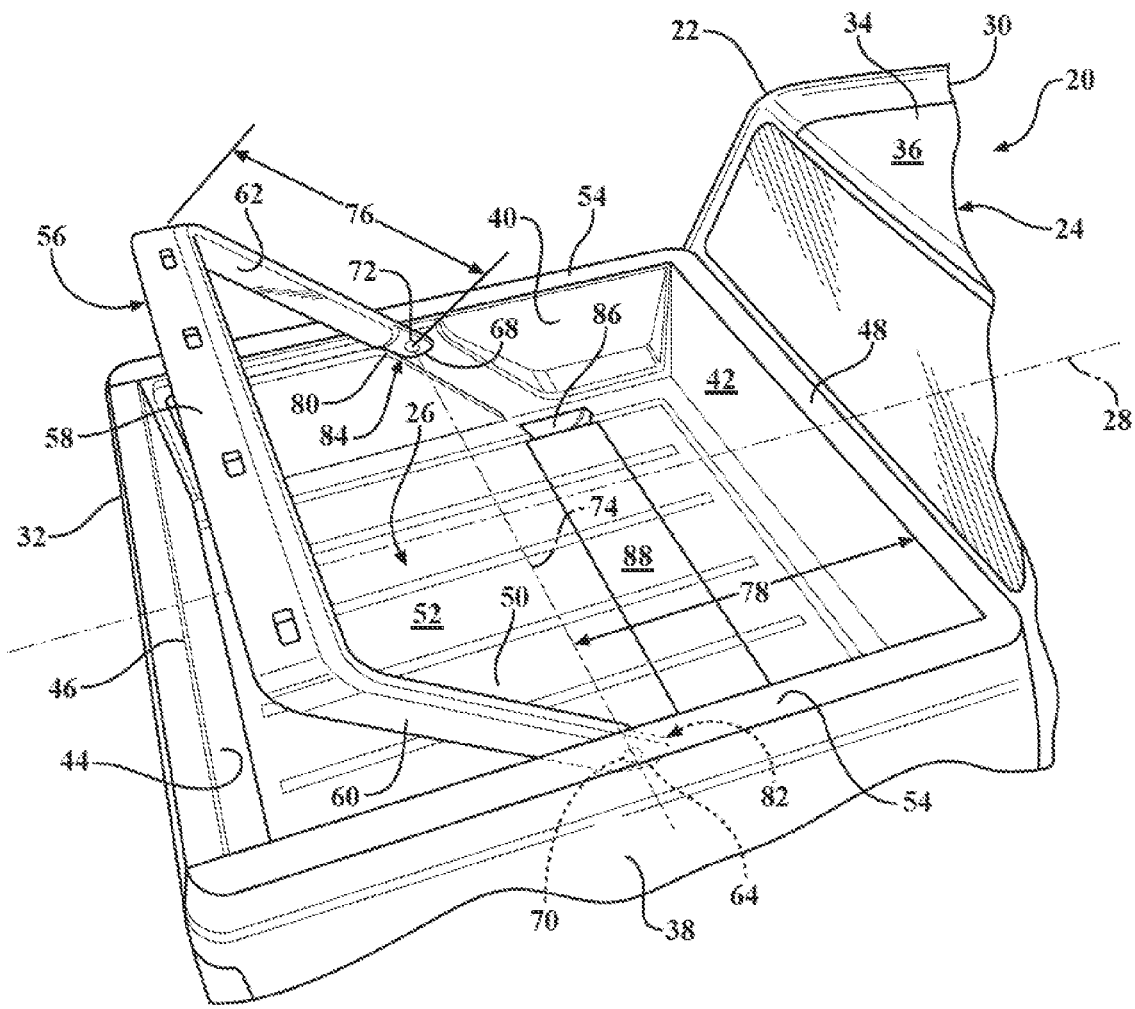
FIG. 1 is a schematic perspective view of a vehicle showing a cargo rack in a deployed position.
Figure 2:
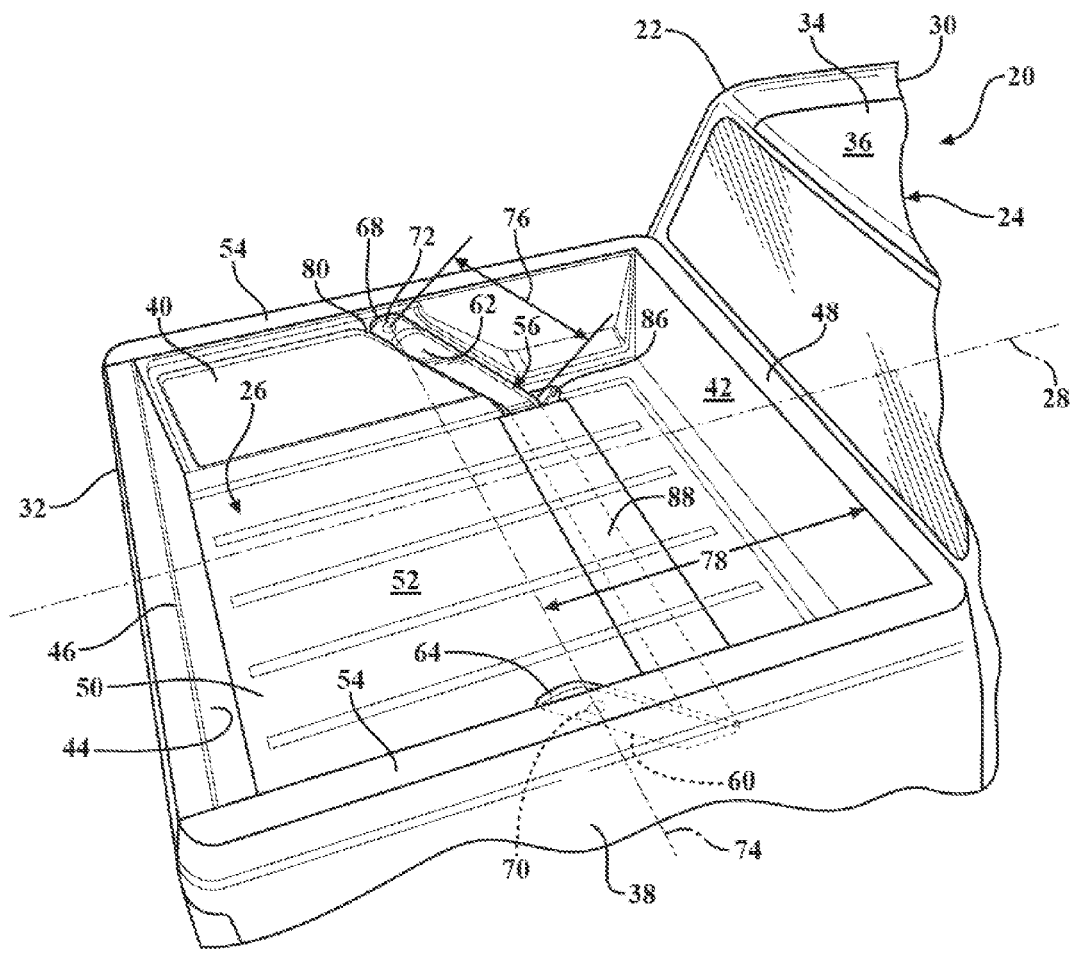
FIG. 2 is a schematic perspective view of the vehicle showing the cargo rack in a stowed position.
Figure 3:
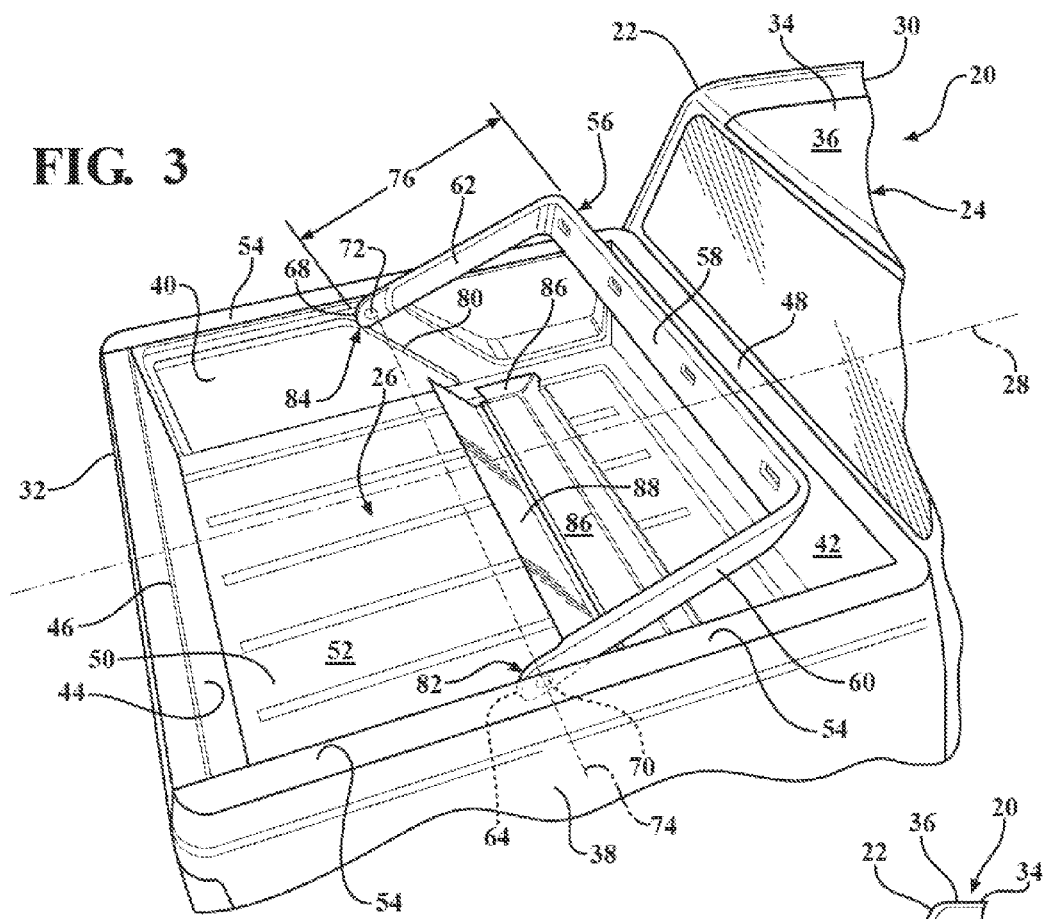
FIG. 3 is a schematic perspective view of the vehicle showing the cargo rack in an intermediate position.

Referring to the Figures, wherein like numerals indicate like parts throughout the several views, a vehicle is generally shown at 20. It should be appreciated that terms such as "above," "below," "upward," "downward," "top," "bottom," "upper," "lower," "forward," "rearward," etc., are used descriptively for the figures, and do not represent limitations on the scope of the invention, as defined by the appended claims.

Referring to FIGS. 1 through 4, the vehicle 20 may include, but is not limited to, a pick-up truck or other similarly configured style of vehicle 20, which includes a body 22 defining a passenger compartment 24 and an exposed cargo area 26. The vehicle 20 extends along a longitudinal axis 28 between a forward end 30 of the vehicle 20 and a rearward end 32 of the vehicle 20. The passenger compartment 24 is disposed nearer the forward end 30 of the vehicle 20 than the cargo area 26, with the cargo area 26 disposed adjacent the rearward end 32 of the vehicle 20.

The passenger compartment 24 includes a roof 34 that defines a roof surface 36. The roof surface 36 is disposed along a generally horizontal plane at an elevation. The exposed cargo area 26 is open from above to allow access thereto. The body 22 further includes a first side wall 38, a second side wall 40, a front wall 42 and a rear wall 44. The rear wall 44 may be referred to as a tailgate. The first side wall 38 and the second side wall 40 extend along and parallel with the longitudinal axis 28 of the vehicle 20, and are spaced opposite each other to define the cargo area 26 therebetween. The rear wall 44 defines a rearward end 46 of the cargo area 26, and the front wall 42 defines a forward end 48 of the cargo area 26. Accordingly, the front wall 42 and the rear wall 44 cooperate with the first side wall 38 and the second side wall 40 to define the perimeter of the cargo area 26.

The body 22 includes a bed 50 that extends laterally between the first side wall 38 and the second side wall 40, and longitudinally between the rear wall 44 and the front wall 42. The bed 50 defines a lower vertical surface 52 of the cargo area 26. The first side wall 38, the second side wall 40, the front wall 42 and the rear wall 44 each define an upper edge 54 thereof. The upper edge 54s of the first side wall 38, the second side wall 40, the front wall 42 and the rear wall 44 are disposed above the lower vertical surface 52 of the cargo area 26 defined by the bed 50, and are disposed below the roof surface 36. Accordingly, the upper edges 54 of the first side wall 38, the second side wall 40, the front wall 42 and the rear wall 44 are disposed at a vertical elevation between the lower vertical surface 52 of the bed 50 and the roof surface 36 of the passenger compartment 24.

The vehicle 20 further includes a cargo rack 56. The cargo rack 56 is attached to and extends between the first side wall 38 and the second side wall 40. The cargo rack 56 includes a crossbar portion 58, a first extension 60 and a second extension 62. The crossbar portion 58 extends laterally across the cargo area 26, perpendicularly relative to the longitudinal axis 28. The first extension 60 is attached to the crossbar portion 58, and extends away from the crossbar portion 58 to a mounting end 64, which is spaced from the crossbar portion 58. The second extension 62 is attached to the crossbar portion 58, and extends away from the crossbar portion 58 to a mounting end 68, which is spaced from the crossbar portion 58. The first extension 60, the crossbar portion 58 and the second extension 62 define a generally U-shaped cargo rack 56. The mounting end 64 of the first extension 60 is pivotably mounted to the first side wall 38 at a first connection point 70. The mounting end 68 of the second extension 62 is pivotably mounted to the second side wall 40 at a second connection point 72.

The cargo rack 56 is rotatably moveable about a rotation axis 74 that extends through the first connection point 70 and the second connection point 72. The cargo rack 56 rotates between a deployed position, shown in FIG. 1, and a stowed position, shown in FIG. 2. When in the deployed position, the crossbar portion 58 of the cargo rack 56 is vertically spaced above the upper edges 54 of the first side wall 38 and the second side wall 40. When in the stowed position, the cargo rack 56 is concealed to provide uninterrupted access to the cargo area 26 from above.

The first extension 60 and the second extension 62 each include a length 76 between the crossbar portion 58 and the mounting ends 64, 68 of the first extension 60 and the second extension 62. The first connection point 70 and the second connection point 72 are spaced from the forward end 48 of the cargo area 26 along the longitudinal axis 28 a distance 78 equal to or greater than the length 76 of the first extension 60 and the second extension 62. This ensures that the cargo rack 56 may rotate freely without interference from the front wall 42 of the cargo area 26. Additionally, the first connection point 70 and the second connection point 72 are disposed adjacent the upper edges 54 of the first side wall 38 and the second side wall 40 respectively. Preferably, the first pivot connection and the second pivot connection are disposed approximately halfway between the vertical elevation of the roof surface 36 of the passenger compartment 24 and the lower vertical surface 52 of the bed 50.

As shown in FIGS. 1 through 4, the cargo rack 56 rotates toward the rearward end 32 of the body 22 when moving from the stowed position into the deployed position, and rotates toward a forward end 30 of the body 22 when moving from the deployed position into the stowed position. The cargo rack 56 rotates about the rotation axis 74 a maximum of one hundred eighty degrees (180°) when moving between the stowed position and the deployed position. As such, with the first connection point 70 and the second connection point 72 disposed approximately halfway between the elevation of the roof surface 36 and the lower vertical surface 52 of the bed 50, the maximum one hundred eighty degrees (180°) rotation of the cargo rack 56 from the stowed position into the deployed position places the crossbar portion 58 approximately equal in elevation with the roof surface 36, thereby allowing cargo to be supported on a common plane, i.e., elevation, by the roof surface 36 and the crossbar portion 58.

The first side wall 38 and the second side wall 40 may each include a stop 80. The stop 80 is configured to prevent rotation of the cargo rack 56 beyond the deployed position, and to limit rotation to the maximum of one hundred eighty degrees (180°). The stop 80 may include a feature formed into the first side wall 38 and the second side wall 40 respectively, such as but not limited to a ledge, a block or some other physical feature. Alternatively, the stop 80 may include some device capable of locking and/or securing the first extension 60 and the second extension 62 to the first side wall 38 and the second side wall 40 respectively.

The vehicle 20 may further include a latching mechanism 82, 84. The latching mechanism 82, 84 is configured for releasably securing the cargo rack 56 in an intermediate position, shown in FIG. 3, which is disposed between the stowed position and the deployed position. The intermediate position may include any position of the cargo rack 56 between the deployed position and the stowed position. The intermediate position may include one or more pre-set and defined positions, or may include a variable position between the stowed position and the deployed position. Preferably, the latching mechanism 82, 84 includes a first latching mechanism 82 interconnecting the first extension 60 and the first side wall 38, and a second latching mechanism 84 interconnecting the second extension 62 and the second side wall 40. The latching mechanism 82, 84 may include any device, such as but not limited to a clamp or a spring loaded pin, capable of securing the position of the cargo rack 56 relative to the body 22 of the vehicle 20.

Figure 4:
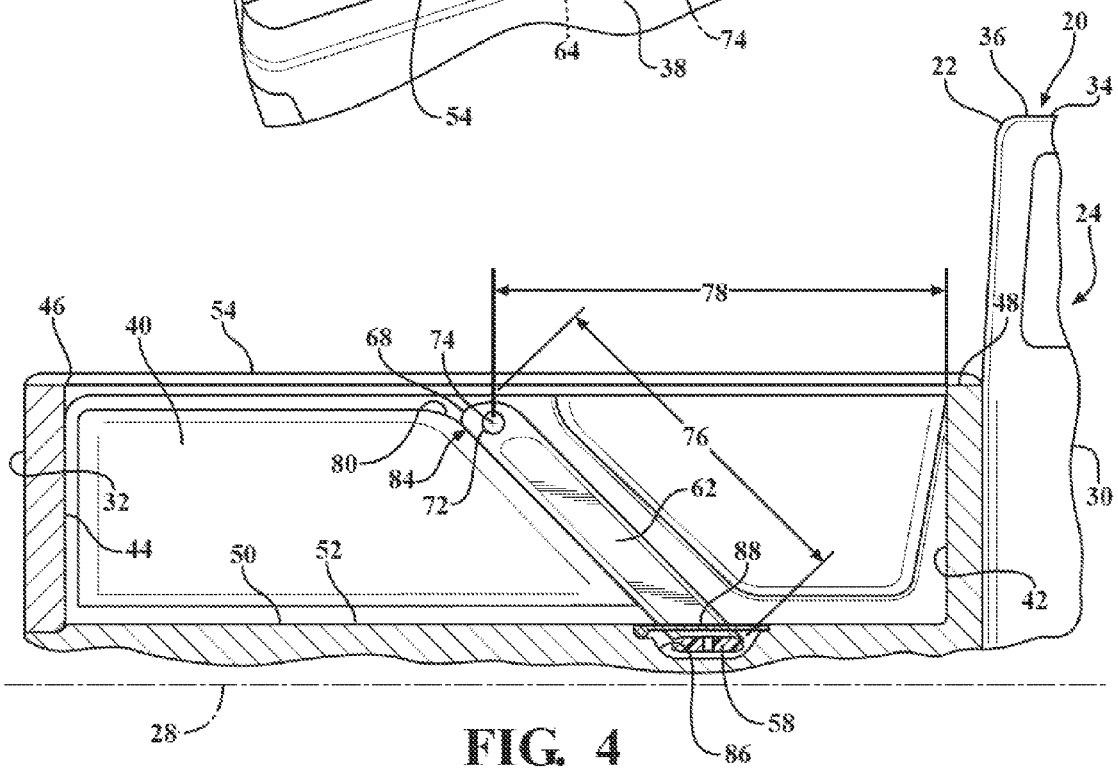
FIG. 4 is a schematic cross sectional view of the vehicle showing the cargo rack in the stowed position.

As best shown in FIG. 4, the bed 50 defines a trough 86. The trough 86 extends below the lower vertical surface 52 of the bed 50. The trough 86 receives the crossbar portion 58 therein when the cargo rack 56 is in the stowed position such that the crossbar portion 58 is disposed equal to or below the lower vertical surface 52 of the bed 50. A cover 88 extends longitudinally across the trough 86, and is rotatably mounted to the bed 50. The cover 88 rotates between an open position exposing the trough 86 and a closed position covering the trough 86. When in the closed position, the cover 88 is coplanar with the lower vertical surface 52 of the bed 50. Accordingly, when the cargo rack 56 is disposed in the stowed position, the crossbar portion 58 is disposed in the trough 86, with the cover 88 extending across the trough 86 to cover 88 the crossbar portion 58 and provide a consistent and uniform lower vertical surface 52 of the bed 50. To move the cargo rack 56 from the stowed position into the deployed position, the cover 88 is moved to the open position, thereby allowing the cargo rack 56 to rotate upward into the intermediate position or the fully deployed position. Once the cargo rack 56 is positioned out of the trough 86, the cover 88 may then be moved back into the closed position to cover 88 the empty trough 86.

Figure 5:
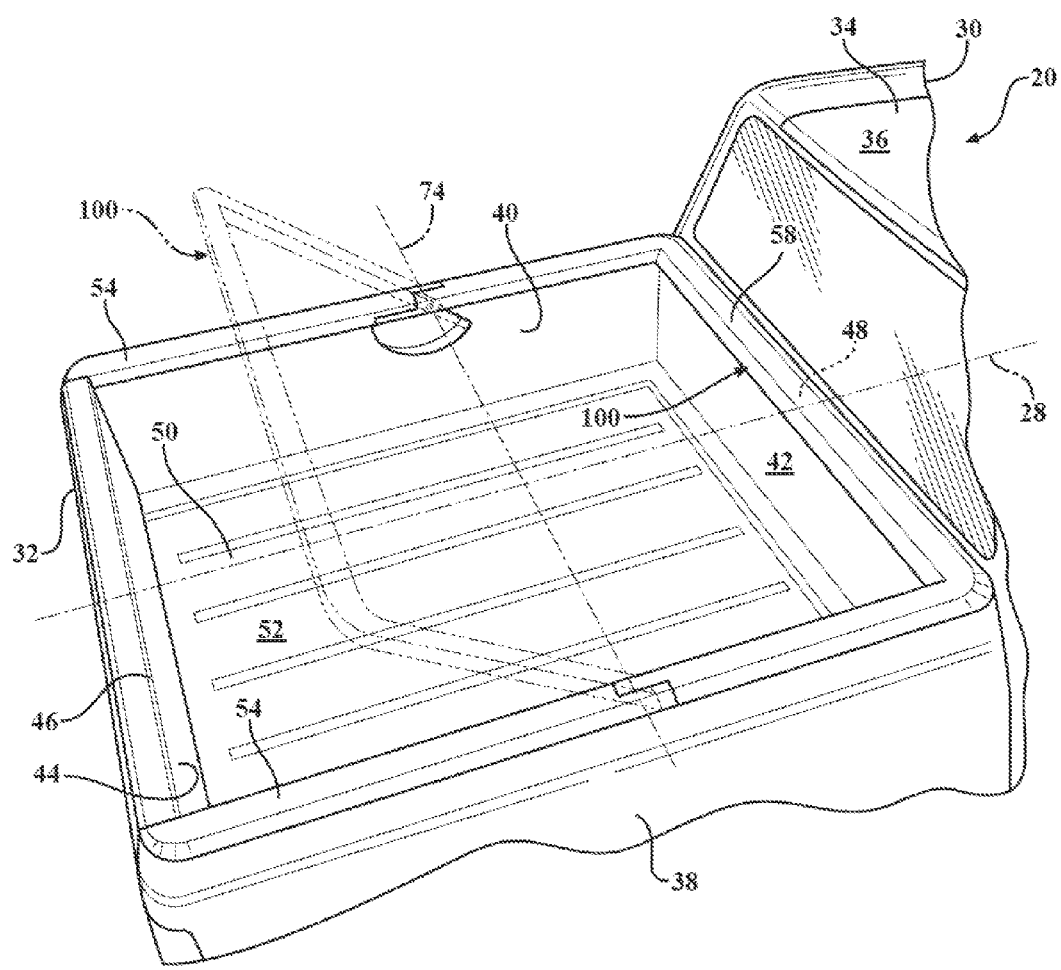
FIG. 5 is a schematic perspective view of the vehicle showing a first alternative embodiment of the cargo rack.

Referring to FIG. 5, a first alternative embodiment of the cargo rack is generally shown at 100. The cargo rack 100 of FIG. 5 rotates toward the rearward end 32 of the vehicle 20 when moving from the stowed position, shown with solid lines, into the deployed position, shown with phantom lines, and rotates toward the forward end 30 of the vehicle 20 when moving from the deployed position into the stowed position. The crossbar portion 58 shown in FIG. 5 is disposed adjacent the upper edge 54 of the front wall 42 when in the stowed position. The cargo rack 100 rotates about the rotation axis 74 a maximum of one hundred thirty five degrees (135°) when moving between the stowed position and the deployed position.

Figure 6:
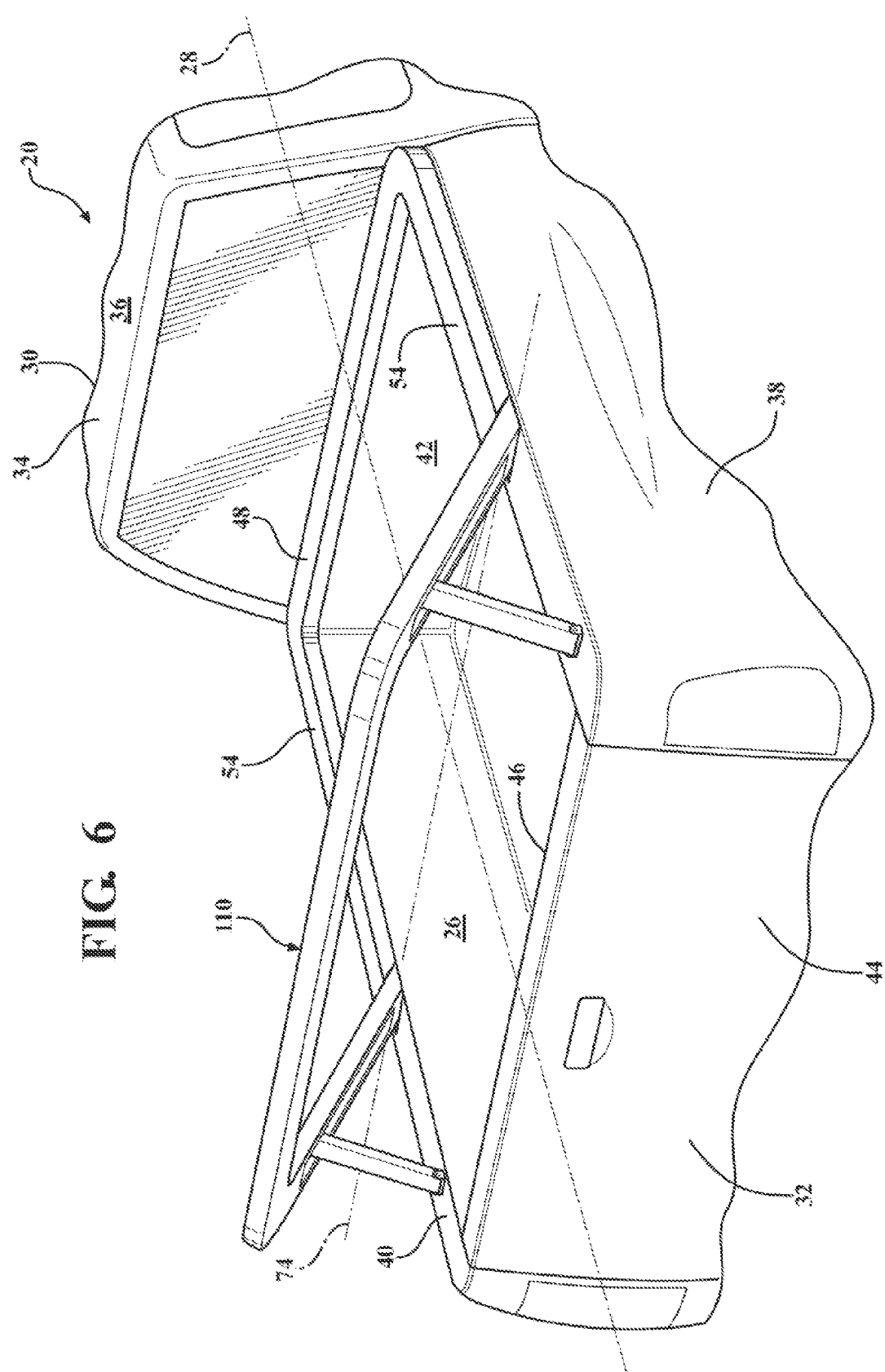
FIG. 6 is a schematic perspective view of the vehicle showing a second alternative embodiment of the cargo rack.

Referring to FIG. 6, a second alternative embodiment of the cargo rack is generally shown at 110. The cargo rack 110 of FIG. 6 rotates toward the forward end 30 of the vehicle 20 when moving from the stowed position into the deployed position, and rotates toward the rearward end 32 of the vehicle 20 when moving from the deployed position into the stowed position. The cargo rack 110 is shown in the deployed position in FIG. 6. The crossbar portion 58 shown in FIG. 5 is disposed adjacent the upper edge 54 of the tail gate portion when in the stowed position. The cargo rack 110 rotates about the rotation axis 74 a maximum of forty five degrees (45°) when moving between the stowed position and the deployed position.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body including a first side wall and a second side wall, with the first side wall and the second side wall extending along a longitudinal axis and spaced opposite each other to define a cargo area therebetween;
wherein the first side wall and the second side wall each define an upper edge; and
a cargo rack attached to and extending between the first side wall and the second side wall, and pivotably moveable between a stowed position and a deployed position, wherein the cargo rack includes a crossbar portion that is vertically spaced above the upper edges of the first side wall and the second side wall when in the deployed position, and wherein the cargo rack is concealed to provide uninterrupted access to the cargo area when in the stowed position;
wherein the cargo rack includes a first extension attached to the crossbar portion and the first side wall, and a second extension attached to the crossbar portion and the second side wall;
wherein the first extension includes a mounting end spaced from the crossbar portion and pivotably mounted to the first side wall at a first connection point, and wherein the second extension includes a mounted end spaced from the crossbar portion and pivotably mounted to the second side wall at a second connection point;
wherein the body defines a passenger compartment having a roof surface disposed at an elevation, wherein the crossbar portion is disposed at an elevation substantially equal to the elevation of the roof surface when the cargo rack is in the deployed position;
wherein the body defines a bed extending between the first side wall and the second side wall and defining a lower vertical surface of the cargo area;
wherein the bed defines a trough extending below the lower vertical surface of the bed for receiving the crossbar portion therein such that the crossbar portion is disposed equal to or below the lower vertical surface of the bed when in the stowed position; and
a cover extending across the trough and rotatably mounted to the bed for rotation between an open position exposing the trough and a closed position covering the trough.

2. A vehicle as set forth in claim 1 wherein the first extension, the crossbar portion and the second extension define a generally U-shaped cargo rack.

3. A vehicle as set forth in claim 1 wherein the cargo rack is rotatably moveable about a rotation axis that extends through the first connection point and the second connection point.

4. A vehicle as set forth in claim 3 wherein the cargo rack rotates about the rotation axis a maximum of one hundred eighty degrees (180°) when moving between the stowed position and the deployed position.

5. A vehicle as set forth in claim 3 wherein the first side wall and the second side wall each include a stop configured to prevent rotation of the cargo rack beyond the deployed position.

6. A vehicle as set forth in claim 1 wherein the first extension and the second extension each include a length, and wherein the first connection point and the second connection point are spaced from a forward end of the cargo area along the longitudinal axis a distance equal to or greater than the length of the first extension and the second extension.

7. A vehicle as set forth in claim 1 wherein the first connection point and the second connection point are disposed adjacent the upper edges of the first side wall and the second side wall respectively.

8. A vehicle as set forth in claim 1 further comprising a latching mechanism configured for releasably securing the cargo rack in an intermediate position disposed between the stowed position and the deployed position.

9. A vehicle as set forth in claim 8 wherein the latching mechanism includes a first latching mechanism interconnecting the first extension and the first side wall, and a second latching mechanism interconnecting the second extension and the second side wall.

10. A vehicle as set forth in claim 8 wherein the intermediate position includes any position of the cargo rack between the deployed position and the stowed position.

11. A vehicle as set forth in claim 1 wherein the first pivot connection and the second pivot connection are disposed approximately halfway between the roof surface of the passenger compartment and the lower vertical surface of the bed.

12. A vehicle as set forth in claim 1 wherein the cargo rack rotates toward a rearward end of the body when moving from the stowed position into the deployed position, and rotates toward a forward end of the body when moving from the deployed position into the stowed position.

13. A vehicle as set forth in claim 1 wherein the cargo rack rotates toward a forward end of the body when moving from the stowed position into the deployed position, and rotates toward a rearward end of the body when moving from the deployed position into the stowed position.

14. A vehicle comprising:
a body including a first side wall, a second side wall, a front wall and a rear wall, wherein the first side wall and the second side wall extend along a longitudinal axis and are spaced opposite each other, and the front wall and the rear wall are disposed perpendicularly relative to the longitudinal axis and are spaced opposite each other along the longitudinal axis, and wherein the first side wall, the second side wall, the front wall and the rear wall cooperate to define a cargo area therebetween;

wherein the first side wall and the second side wall each define an upper edge;

a cargo rack including a crossbar portion extending between the first side wall and the second side wall, a first extension attached to the crossbar portion and extending from the crossbar portion a length to a mounting end of the first extension, and a second extension attached to the crossbar portion and extending from the crossbar portion a length to a mounting end of the second extension;

wherein the mounting end of the first extension is pivotably mounted to the first side wall at a first connection point, and the mounting end of the second extension is pivotably mounted to the second side wall at a second connection point;

wherein the cargo rack is pivotably moveable about a rotation axis extending between the first connection point and the second connection point between a stowed position and a deployed position;

wherein the crossbar portion is vertically spaced above the upper edges of the first side wall and the second side wall when in the deployed position, and is concealed to provide uninterrupted access to the cargo area from above when in the stowed position;

wherein the first connection point and the second connection point are spaced from the front wall of the cargo area along the longitudinal axis a distance equal to or greater than the length of the first extension and the second extension;

wherein the first connection point and the second connection point are disposed adjacent the upper edges of the first side wall and the second side wall respectively; and a latching mechanism configured for releasably securing the cargo rack in an intermediate position disposed between the stowed position and the deployed position.

* * * * *